United States Patent
Osogami

(10) Patent No.: US 11,755,946 B2
(45) Date of Patent: Sep. 12, 2023

(54) CUMULATIVE REWARD PREDICTOR TRAINING

(71) Applicant: INTERNATIONAL BUSINESS MACHINES CORPORATION, Armonk, NY (US)

(72) Inventor: Takayuki Osogami, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 913 days.

(21) Appl. No.: 16/677,986

(22) Filed: Nov. 8, 2019

(65) Prior Publication Data

US 2021/0142208 A1 May 13, 2021

(51) Int. Cl.
*G06N 20/00* (2019.01)
*G06N 7/01* (2023.01)

(52) U.S. Cl.
CPC .............. *G06N 20/00* (2019.01); *G06N 7/01* (2023.01)

(58) Field of Classification Search
CPC ........ G06N 20/00; G06N 20/10; G06N 20/20; G06N 7/00; G06N 7/005; G06N 5/00; G06N 5/02; G06N 5/04
See application file for complete search history.

(56) References Cited

U.S. PATENT DOCUMENTS 9,811,781 B2  11/2017  Ariyoshi et al.
2018/0012137 A1  1/2018  Wright et al.

OTHER PUBLICATIONS

Boyan et al. "Technical Update: Least-Squares Temporal Difference Learning" 2002 https://link.springer.com/content/pdf/10.1023/A:1017936530646.pdf (Year: 2002).*
Xu et al. "Efficient Reinforcement Learning Using Recursive Least-Squares Methods" 2002 https://citeseerx.ist.psu.edu/viewdoc/download?doi=10.1.1.72.8517&rep=rep1&type=pdf (Year: 2002).*
Morimura et al. "Utilizing the Natural Gradient in Temporal Difference Reinforcement Learning With Eligibility Traces" 2005 https://www.researchgate.net/publication/228622453_Utilizing_the_natural_gradient_in_temporal_difference_reinforcement_learning_with_eligibility_traces (Year: 2005).*

(Continued)

*Primary Examiner* — Kamran Afshar
*Assistant Examiner* — Shoun J Abraham
(74) *Attorney, Agent, or Firm* — Tutunjian & Bitetto, P.C.; Peter Edwards

(57) ABSTRACT

A cumulative reward of a target system type is predicted by training a prediction model by performing an iteration for each time step. The iteration includes recursively updating a matrix by using the weighted difference between an eligibility trace of a current time step and an eligibility trace of a previous time step, recursively updating a vector by using a reward of a subsequent time step and the eligibility trace of the current time step, and recursively updating an eligibility trace of a subsequent time step by using a feature vector of the subsequent time step. Each feature vector is an encoded representation of a state of a training system of the target system type at a corresponding time step. The matrix and the vector are output as the prediction model for estimating the cumulative reward of a target time step of a target system of the target system type.

20 Claims, 8 Drawing Sheets

(56) References Cited

OTHER PUBLICATIONS

Scherrer et al. "Recursive Least-Squares Learning with Eligibility Traces" 2012 https://link.springer.com/chapter/10.1007/978-3-642-29946-9_14 (Year: 2012).*
Pan, "Accelerated Gradient Temporal Difference Learning", Proceedings of the 31st AAAI Conference on Artificial Intelligence, Feb. 2017, pp. 2462-2470.
Mann, "Adaptive Least-Squares Temporal Difference Learning", Dec. 2016, 7 pages.
Boyan, "Technical Update: Least-Squares Temporal Difference Learning", Machine Learning, vol. 49, Nov. 2002, pp. 233-246.
Zhong, "Efficient Reinforcement Learning in Continuous State and Action Spaces with Dyna and Policy Approximation", Frontiers of Computer Science, vol. 13, Issue 1, Feb. 2019, pp. 106-126.
Van Seijen, "True Online Temporal-Difference Learning", Journal of Machine Learning Research, vol. 17, Aug. 2016, 40 pages.
Hyndman, "Automatic Time Series Forecasting: the Forecast Package for R", Monash University Dept of Econometrics and Business Statistics, Jun. 2007, 31 pages.
"Introduction to ARIMA Models", https://people.duke.edu/~mau/411arim.htm, Jul. 2019, 5 pages.
Boateng, "Time Series Analysis Methods: Building Arima Models for Forecasting", https://rstudio-pubs-static.s3.amazonaws.com/303786_f1b99d6b7e9346c4b1488a174bab839a.html, Jul. 2019, 49 pages.
List of IBM Patents or Patent Applications Treated as Related dated Nov. 8, 2019, 2 pages.

* cited by examiner

500

$$A^{-1}, b, z_{-1} \leftarrow \frac{1}{\alpha} I, 0, 0;$$
$$z_0 \leftarrow \phi_0;$$
for $t = 0, 1, \ldots$ do
$$\quad \delta \leftarrow z_t - \gamma z_{t-1};$$
$$\quad A^{-1} \leftarrow A^{-1} - \frac{A^{-1} \delta \varphi_t^\top A^{-1}}{1 + \varphi_t^\top A^{-1} \delta};$$
$$\quad b \leftarrow b + r_{t+1} z_t;$$
$$\quad z_{t+1} \leftarrow \lambda \gamma z_t + \phi_{t+1};$$
$$\quad \theta = A^{-1} b;$$
end

$$A^{-1}, b, z_{-1} \leftarrow \frac{1}{\alpha} I, 0, 0;$$
$$z_0 \leftarrow \phi_0;$$
for $t = 0, 1, \ldots$ do
$\quad \delta \leftarrow \phi_t - \gamma \phi_{t+1};$
$\quad A^{-1} \leftarrow A^{-1} - \frac{A^{-1} z_t \delta^\top A^{-1}}{1 + \delta^\top A^{-1} z_t};$
$\quad b \leftarrow b + r_{t+1} z_t;$
$\quad z_{t+1} \leftarrow \lambda \gamma z_t + \phi_{t+1};$
$\quad \theta = A^{-1} b;$
end

$$A^{-1}, b, z_{-1} \leftarrow \frac{1}{\alpha} I, 0, 0;$$
$$z_0 \leftarrow \phi_0;$$
for $t = 0, 1, \ldots$ do
$$\delta \leftarrow \lambda(z_t - \gamma z_{t-1});$$
$$A^{-1} \leftarrow A^{-1} - \frac{A^{-1}\delta\varphi_t^\top A^{-1}}{1 + \varphi_t^\top A^{-1}\delta};$$
$$\delta \leftarrow (1 - \lambda)(\varphi_t - \gamma\varphi_{t+1})$$
$$A^{-1} \leftarrow A^{-1} - \frac{A^{-1}z_t\delta^\top A^{-1}}{1 + \delta^\top A^{-1}z_t};$$
$$b \leftarrow b + r_{t+1} z_t;$$
$$z_{t+1} \leftarrow \lambda\gamma z_t + \phi_{t+1};$$
$$\theta = A^{-1} b;$$
end

$r_2$   $r_3$   $r_{t+1}$   $r_T$
$s_1 \xrightarrow{a_1} s_2 \xrightarrow{a_2} s_3 \; \blacksquare\blacksquare\blacksquare \; s_t \xrightarrow{a_t} s_{t+1} \; \blacksquare\blacksquare\blacksquare \; s_{T-1} \xrightarrow{a_{T-1}} s_T$
$\phi_1$   $\phi_2$   $\phi_3$ $\blacksquare\blacksquare\blacksquare$ $\phi_t$   $\phi_{t+1}$ $\blacksquare\blacksquare\blacksquare$ $\phi_{T-1}$   $\phi_T$

CUMULATIVE REWARD PREDICTOR TRAINING

BACKGROUND

Technical Field

The present invention relates to training a model, and more specifically, to training a prediction model for a cumulative reward of a system.

Related Art

Future values of a system (e.g., physical or non-physical system) may be predicted by using reinforcement learning. For example, the values of the system may be a temperature in a machine or a water level of a river. By predicting a cumulative reward, it may be possible to understand how values will change in the future.

However, prediction of the cumulative reward is sometimes difficult, especially when the values are non-stationary, and where suitable values of hyperparameters for a prediction model change overtime. For non-stationary values, a prediction model may work well for a certain period of time, but work poorly for another period.

SUMMARY

According to an aspect of the present invention, provided is a computer-implemented method for prediction of a cumulative reward of a target system type, including: training a prediction model by performing an iteration for each time step, the iteration including at least: recursively updating a matrix by using the weighted difference between an eligibility trace of a current time step and an eligibility trace of a previous time step, recursively updating a vector by using a reward of a subsequent time step and the eligibility trace of the current time step; and recursively updating an eligibility trace of a subsequent time step by using a feature vector of the subsequent time step, each feature vector being an encoded representation of at least a state of a training system of the target system type at a corresponding time step, and outputting the matrix and the vector as the prediction model for estimating the cumulative reward of a target time step of a target system of the target system type.

The foregoing aspect may also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the method. The summary clause does not necessarily describe all features of the embodiments of the present invention. Embodiments of the present invention may also include sub-combinations of the features described above.

BRIEF DESCRIPTION OF THE DRAWINGS

FIG. 5 shows an exemplary process for training a prediction model, according to an embodiment of the present invention.

FIG. 6 shows a process for training an LSTD($\lambda$) prediction model, according to an embodiment of the present invention.

FIG. 8 shows an exemplary process for training a prediction model, according to another embodiment of the present invention.

FIG. 9 shows states, actions and rewards, according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
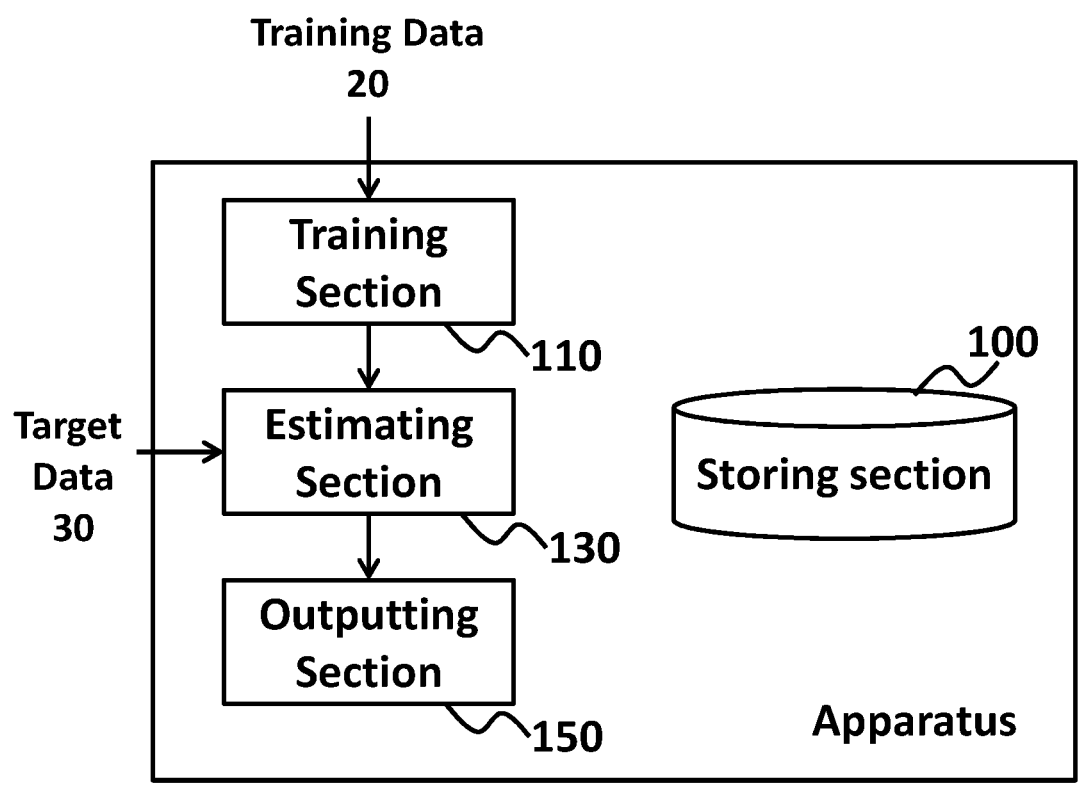
FIG. 1 shows an exemplary configuration of an apparatus, according to an embodiment of the present invention.

FIG. 1 shows an exemplary configuration of an apparatus 10, according to an embodiment of the present invention. The apparatus 10 may train a prediction model used for prediction of a cumulative reward. In some embodiments, the apparatus 10 may train a prediction model that stably predicts the cumulative reward for non-stationary values.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, a training section 110, an estimating section 130 and an outputting section 150. The storing section 100 stores information used for the processing that the apparatus 10 performs. The storing section 100 may also store a variety of data/instructions used for operations of the apparatus 10.

One or more other elements in the apparatus 10 (e.g., the training section 110, the estimating section 130, and the outputting section 150) may communicate data directly or via the storing section 100, as necessary.

The storing section 100 may be implemented by a volatile or non-volatile memory of the apparatus 10. In some embodiments, the storing section 100 may store training data 20, prediction model parameters, and other parameters and data related thereto.

The training section 110 may train a prediction model for predicting a cumulative reward. In an embodiment, the training section 110 may use Least Square Temporal Difference (LSTD) in at least part of the process of training the prediction model. The training section 110 may train the prediction model by using training data 20 that is related to a training system.

The estimating section 130 may estimate a cumulative reward of a target system (for example, including target data 30) by using the prediction model. The target system may be physical or non-physical system that includes a plurality of sequential states. In an embodiment, the estimating section 130 may calculate an output from the prediction model as the cumulative reward. The cumulative reward may be represented by $G=r_{t+1}+\gamma r_{t+2}+\gamma^2 r_{t+3}+\ldots$, where $r_t$ may represent reward at time step t. In an embodiment, the reward $r_{t+1}$ may be a difference of a value $x_t$ at a current time step (e.g., a water level of a river at time step t) and a value $x_{t+1}$ at a subsequent time step (e.g., a water level of a river at time step t+1) in the target system. When a reward in reinforcement learning is represented by a difference of a value at a current time step and a value at a subsequent time step (e.g., $r_{t+1}=x_{t+1}-x_t$), a cumulative reward (e.g., $G=r_{t+1}+\gamma r_{t+2}+\gamma^2 r_{t+3}+\ldots$) represents tendency of changes in the values. The cumulative reward may represent tendency of changes in the values of the target system. In an embodiment, the estimating section 130 may further predict a future value of a target system by using the cumulative rewards of the target system.

The outputting section 150 may output the estimated cumulative reward or the value of the target system. In an embodiment, the outputting section 150 may display the estimated cumulative reward or the value of the target system on a screen of the apparatus 10 or transmit them to another apparatus.

According to FIG. 1, the training section 110, the estimating section 130, and the outputting section 150 are equipped in a single entity or device (e.g., the apparatus 10). In other embodiments, these sections are separately equipped in multiple entities (e.g., two apparatuses). For example, a first apparatus may include the training section 110 while a second apparatus may include the estimating section 130 and the outputting section 150.

Figure 2:
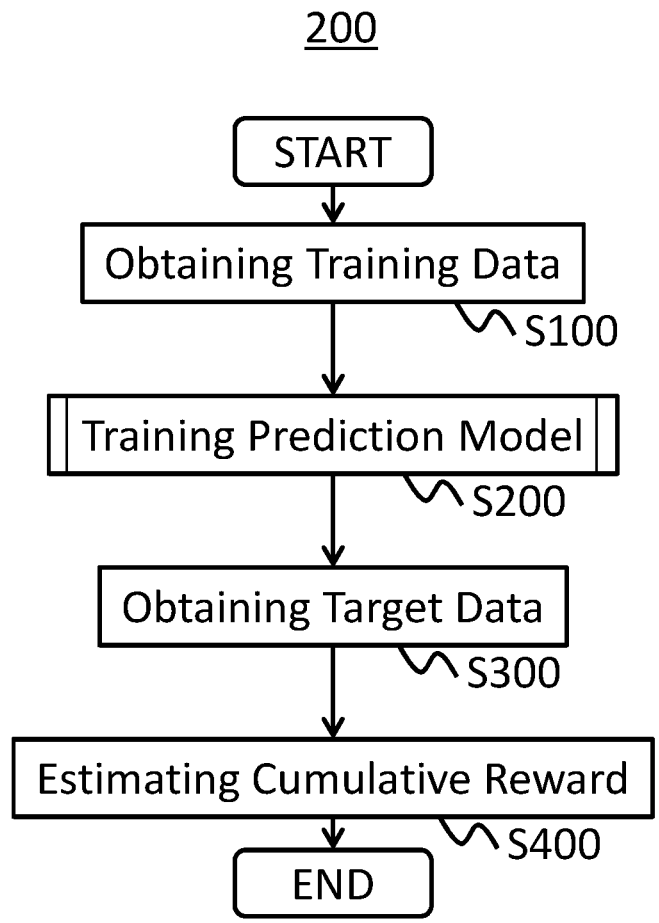
FIG. 2 shows an operational flow according to an embodiment of the present invention.

FIG. 2 shows an operational flow 200 according to an embodiment of the present invention. The present embodiment describes an example in which an apparatus, such as the apparatus 10, performs operations from S100 to S400 to train a prediction model and to estimate a cumulative reward using the trained prediction model.

At S100, a training section such as the training section 110 may obtain training data 20 used for training of a prediction model.

Figure 3:
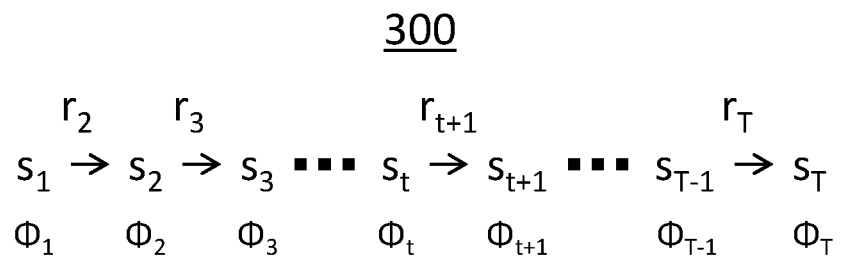
FIG. 3 shows states and rewards of a training system according to an embodiment of the present invention.

FIG. 3 shows states and rewards 300 of a training system according to an embodiment of the present invention. As shown in FIG. 3, starting from a state $s_1$ at a time step (t=) 1, the training system is shifted into a state $s_2$, which yields a reward $r_2$, at a time step 2, then the training system is shifted into a state $s_3$, which yields a reward $r_3$, at a time step 3, . . . , and then the training system is shifted into a state $S_T$, which yields a reward $r_T$ at a time step T. T represents the number of time steps. The transitions of the states may be in accordance with a Markov process.

The training section 110 may obtain sets of states and rewards, each set including a state and a corresponding reward, such as (a state $s_1$, a reward $r_1$), (a state $s_2$, a reward $r_2$), . . . , (a state $s_T$, a reward $r_T$) of time steps 1, 2, 3, . . . , T of a training system as the training data 20.

If the training system used during training is another system, then it must be the same type of system as the target system. For example, if the target system is a machine of which temperature fluctuates, then the training system used during training should also be a machine of which temperature fluctuates. As another example, if the target system is a river of which water level fluctuates, then the training system should also be a river of which water level fluctuates. By using the same type of system, the features vectors can be encoded in the same manner, which allows the prediction model to function properly with the target system.

The training section 110 may generate a feature vector representing each state from the information representing the state in the obtained set. The feature vector $\varphi_t$ at each time step t represents a state of the training system at the corresponding time step t. In an embodiment of FIG. 3, a feature vector $\varphi_1$ represents the state $s_1$, a feature vector $\varphi_2$ represents the state $s_2$, . . . , and a feature vector $\varphi_T$ represents the state $s_T$. In an embodiment, the training section 110 may initially obtain sets of the feature vectors $\varphi_1 \ldots \varphi_T$, and the rewards $r_1 \ldots r_T$ as the training data 20.

At S200, the training section 110 may train a prediction model by using the training data 20 obtained at S100. The training section 110 may estimate a weight vector $\theta^*$ for minimizing a mean squared error by:

$$\theta^*=\mathrm{argmin}_\theta \Sigma_t(\theta^T\varphi_t-y_t)^2 \qquad \text{(Eqn.-1)},$$

where $y_t$ is a cumulative reward, which may be referred to as "$\lambda$ return" in the context of TD($\lambda$) or LSTD($\lambda$).

The cumulative reward $y_t$ may be represented by:

$$y_t=(1-\lambda)(G_{1,t}+\lambda G_{2,t}+\lambda^2 G_{3,t}+\ldots+\lambda^{n-2}G_{n-1,t}+\lambda^{n-1}G_{n,t}') \qquad \text{(Eqn.-1.1), where}$$

$$G_{1,t}=r_t+\gamma V(\varphi_{t+1})$$

$$G_{2,t}=r_t+\gamma\theta^T\varphi_{t+1}+\gamma^2 V(\varphi_{t+2})$$

$$G_{3,t}=r_t+\gamma r_{t+1}+\gamma^2\theta^T\varphi_{t+2}+\gamma^3 V(\varphi_{t+3})$$

. . .

$$G_{n,t}'=r_t+\gamma r_{t+1}+\gamma^2 r_{t+2}\ldots\gamma^{n-1}r_{t+n-1},$$

$\lambda$ may be set to be in a range of $0<\lambda<1$, n may be set to be a predetermined integer, $\gamma$ is a discount factor and may be set to be $1-(1/n)$ or a value close to $1-(1/n)$.

In a usual TD($\lambda$) or LSTD($\lambda$), $G_{n,t}$, as shown below, is used in a position of $G'_{n,t}$ in formula 1.1 (Eqn.-1.1, herein above).

$$G_{n,t}=r_t+\gamma r_{t+1}+\gamma^2 r_{t+2}\ldots\gamma^{n-1}r_{t+n-1}+\gamma^n\theta^T\varphi_{t+n}+\gamma^{n+1}V(\varphi_{t+n+1}) \qquad \text{(Eqn.-1.2)}$$

Meanwhile, in some example embodiments according to the present invention, the training section 110 may use $G'_{n,t}$ instead of $G_{n,t}$.

The training section 110 may use Boyan's Least Square Temporal Difference (LSTD) for at least part of the process of training the prediction model. In an embodiment, the training section 110 may estimate a weight vector $\theta^*$ of the formula (Eqn.-1) by performing an iteration of updating the parameters of the prediction model at each time step. In an embodiment, the training section 110 may recursively update a matrix, a vector and an eligibility trace of the LSTD($\lambda$).

Figure 4:
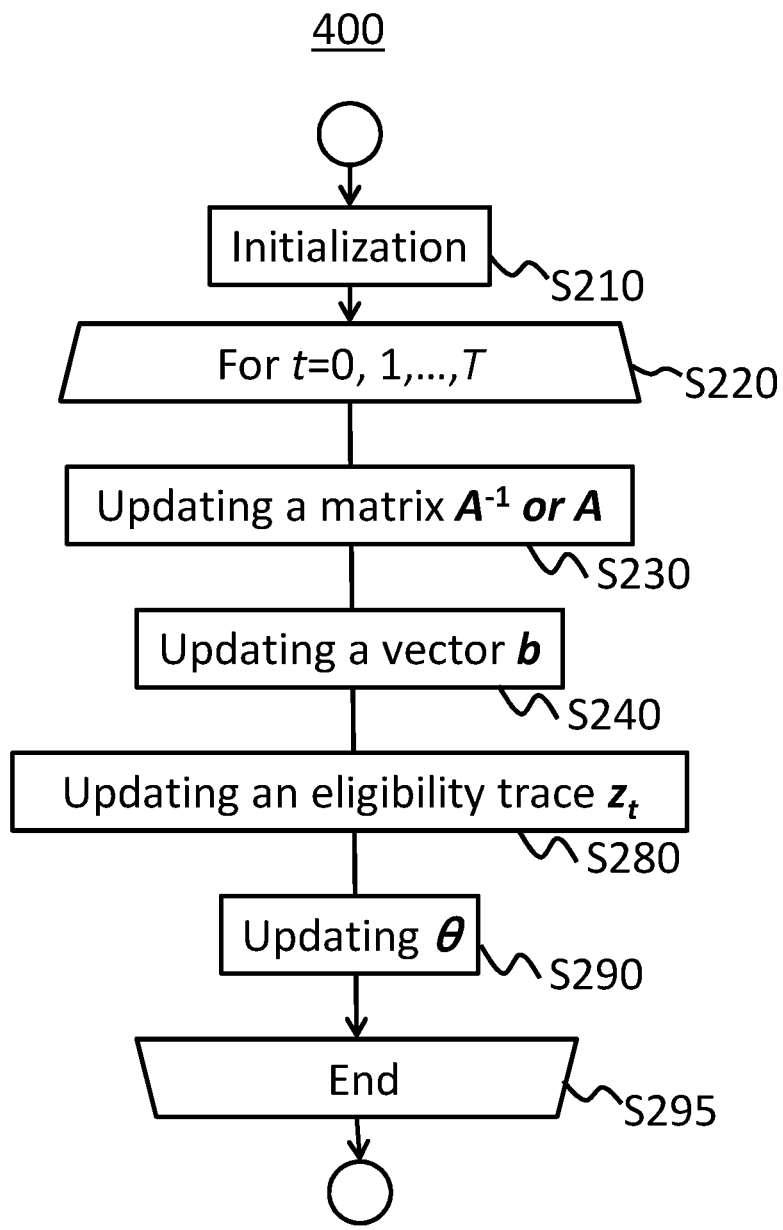
FIG. 4 shows an operational flow of training a prediction model, according to an embodiment of the present invention.

FIG. 4 shows an operational flow 400 of training a prediction model, according to an embodiment of the present invention. The training section 110 may perform the operation of S200 by performing operations of S210-S290 shown in FIG. 4.

At S210, the training section 110 performs initialization of the training. In an embodiment, the training section 110 may set hyperparameters of the training. In an embodiment, the training section 110 may set the values of at least one of $\alpha$ and $\lambda$. In an embodiment, the training section 110 may set a value of $\alpha$ to be in a range of 0.001-1000. In an embodiment, the training section 110 may set a value of $\lambda$ to be in a range of 0-1.

The training section 110 may initialize a matrix A or $A^{-1}$, a vector b, and eligibility traces $z_0$ and $z_{-1}$ of time steps 0 and −1. In an embodiment, the training section 110 may define an inverse matrix $A^{-1}$ of the matrix A to be $\alpha 1$. In an embodiment, the training section 110 may set the vector b to be a zero vector 0. In an embodiment, the training section 110 may set the eligibility trace $z_{-1}$ at time step −1 to be a zero vector 0. In an embodiment, the training section 110 may set the eligibility trace $z_0$ at time step 0 to be a feature vector $\varphi_0$ at time step 0.

After the operation of S210, the training section 110 performs iterations of S230-S290 for each time step t=0, 1, ... T. (S220).

At S230, the training section 110 may recursively update an matrix by using the weighted difference between an eligibility trace $z_t$ of a current time step t and an eligibility trace $z_{t-1}$ of a previous time step t−1. The training section 110 may use a method modified from Boyan's LSTD for at least part of the process of updating the matrix. The training section 110 may update an matrix A, or, an inverse matrix $A^{-1}$ of the matrix A at S230.

In an embodiment, the training section 110 may update the matrix $A^{-1}$ by subtracting, from the matrix $A^{-1}$, a fraction of which numerator is a product of (i) the matrix $A^{-1}$, (ii) the weighted difference between an eligibility trace $z_t$ at a current time step t and an eligibility trace $z_{t-1}$ at a previous time step t−1, (iii) the feature vector $\varphi_t$ of the time step t, and (iv) the matrix $A^{-1}$, and denominator is a sum of (I) a constant and (II) a product of (i) the feature vector $\varphi_t$ of the time step t, (ii) the matrix $A^{-1}$, and the weighted difference between the eligibility trace $z_t$ and the eligibility trace $z_{t-1}$. In an embodiment, (I) the constant may be 1 or other value. In the embodiment, the training section 110 may update the matrix $A^{-1}$ by:

$$A^{-1} \leftarrow A^{-1} - \frac{A^{-1}(z_t - \gamma z_{t-1})\varphi_t^T A^{-1}}{1 + \varphi_t^T A^{-1}(z_t - \gamma z_{t-1})} \quad \text{(Eqn.-2)}$$

In another embodiment, the training section 110 may update the matrix A by adding, to the matrix A, a direct product of (i) the weighted difference between an eligibility trace $z_t$ of a current time step t and an eligibility trace $z_{t-1}$ of a previous time step t−1 and (ii) the feature vector $\varphi_t$ of the time step t. In the embodiment, the training section 110 may update the matrix A by:

$$A \leftarrow A + (z_t - \gamma z_{t-1})\varphi_t^T \quad \text{(Eqn.-3)}$$

The feature vector $\varphi_t$ may be a vector representing a state $s_t$ of the training system at the time step t in the training data 20. The matrix A may record a weighted sum of a product of a value of a feature of the state of the training system at one time step and the value of a feature of the state of the training system at another time step. In an embodiment, the weighted difference between the eligibility trace $z_t$ and the eligibility trace $z_{t-1}$ may be represented by $(z_t - \gamma z_{t-1})$ with the discount factor $\gamma$.

At S240, the training section 110 may recursively update a vector b by using a reward $r_{t+1}$ of a subsequent time step t+1 and the eligibility trace $z_t$ of the current time step t. The vector b may record a weighted sum of the rewards on each dimension of the feature vector, with higher weights on more recently obtained rewards at larger values of the feature.

In an embodiment, the training section 110 may update the vector b by adding a product of the reward $r_{t+1}$ of the subsequent time step t+1 and the eligibility trace $z_t$ of the current time step t, to the vector b. The reward $r_{t+1}$ may be a reward obtained upon transitioning out of the state at the current time step tin the training data 20.

At S280, the training section 110 may recursively update an eligibility trace $z_{t+1}$ of a subsequent time step t+1 by using a feature vector $\varphi_{t+1}$ of the subsequent time step t+1. The eligibility trace $z_t$ may record a weighted sum of the feature vectors of the previous states, with higher weights on more recent states.

In an embodiment, the training section 110 may update the eligibility trace $z_{t+1}$ by adding the feature vector $\varphi_{t+1}$ of the subsequent time step t+1 to a product of a lambda value $\lambda$, a discount factor $\gamma$, and the eligibility trace $z_t$ of the current time step t.

At S290, the training section 110 may update the weight vector $\theta$ by using the updated matrix $A^{-1}$ (or A) and the vector b. In an embodiment, the training section 110 may update $\theta$ by $\theta = A^{-1}b$. When the training section 110 updates A at S230, the training section 110 may calculate $A^{-1}$ from A, or, estimate a solution of $\theta$ for $A\theta = b$. In an embodiment, the training section 110 may omit the operation of S290 only to update the matrix $A^{-1}$, the vector b, and the eligibility trace $z_t$ during each iteration of S230-S280.

The training section 110 may iterate the operations of S230-S290 for a predetermined number of time steps (e.g., t=1 ... T). In an embodiment, the training section 110 may end (S295) the iteration of S230-S290 when an end condition is met. The end condition may be at least one of that a variation of at least one of $\theta$, $A^{-1}$ (or A), b, and $z_t$ in an iteration falls below a threshold, that a predetermined amount of time has passed, or that a predetermined number of states have been processed.

FIG. 5 shows an exemplary process 500 for training a prediction model, according to an embodiment of the present invention. The process 500 of FIG. 5 may represent the sub-flow of FIG. 4. As explained above, the training section 110 may iterate updating of the matrix $A^{-1}$ (or A) and the vector b.

FIG. 6 shows a process 600 for training an LSTD($\lambda$) prediction model, according to an embodiment of the present invention. The process 600 of FIG. 6 may represent Boyan's LSTD. The process 600 of FIG. 6 is different from the process 500 of FIG. 5 in that the matrix $A^{-1}$ (or A) is updated by using the weighted difference of the feature vectors $\varphi_t$ and $\varphi_{t+1}$, instead of the weighted difference of the eligibility traces $z_t$ and $z_{t-1}$.

In the embodiment of FIG. 6, a prediction model may or may not be well trained depending on the values of hyper-parameters (e.g., $\alpha$ and/or $\lambda$) initially set. On the other hand, when trained in the embodiments explained in relation to FIGS. 4-5, a prediction model may generally be well-trained regardless of the values of hyperparameters initially set. As a result, an apparatus such as the apparatus 10 may be capable of predicting non-stationary values in a system much faster and/or with less computational resources.

At S300, an estimating section, such as the estimating section 130, may obtain a state s of a target system, or, a feature vector $\varphi$ representing the state s of the target system. In an embodiment, the estimating section 130 may estimate the feature vector $\varphi$ from the state s. The target and training system may be a physical system (e.g., —a machine of which temperature fluctuates, or a river of which water level fluctuates) or a non-physical system (e.g.,—a financial market of which value fluctuates).

At S400, the estimating section 130 may estimate the cumulative reward of the target system by using the feature vector $\varphi$ of the target system obtained at S300, and the matrix $A^{-1}$ (or A) and the vector b trained at S200. In an embodiment, the estimating section 130 may estimate the cumulative reward by using a product of an inverse matrix of the matrix $A^{-1}$ (or $\lambda$) and the vector b. In a specific embodiment, the estimating section 130 may estimate the cumulative reward y by calculating: $y=(A^{-1}b)^T\varphi$.

Then, the estimating section 130 may predict a future value of a physical or non-physical system by using the estimated cumulative reward. The reward $r_t$ in each time step t represents a difference $(X_t-X_{t-1})$ in values of the target system between the current time step t and the previous time step t−1. The prediction model may predict the cumulative reward y as a cumulative difference $(X_{t+n}-X_t)$ in the value of a future time step (e.g., t+n). In an embodiment, the estimating section 130 may calculate a sum $X_t+y$ of a current value of $X_t$ of the system and the cumulative reward y to obtain a future value $X_{t+n}$ of the target system.

In the embodiments above, the apparatus may train the prediction model in relation to the process of FIG. 5. In other embodiments, the apparatus may train the prediction model by incorporating the process of FIG. 6 into the process of FIG. 5. For example, the training section 110 may perform a sub-flow of FIG. 7 instead of FIG. 4 at S200.

Figure 7:
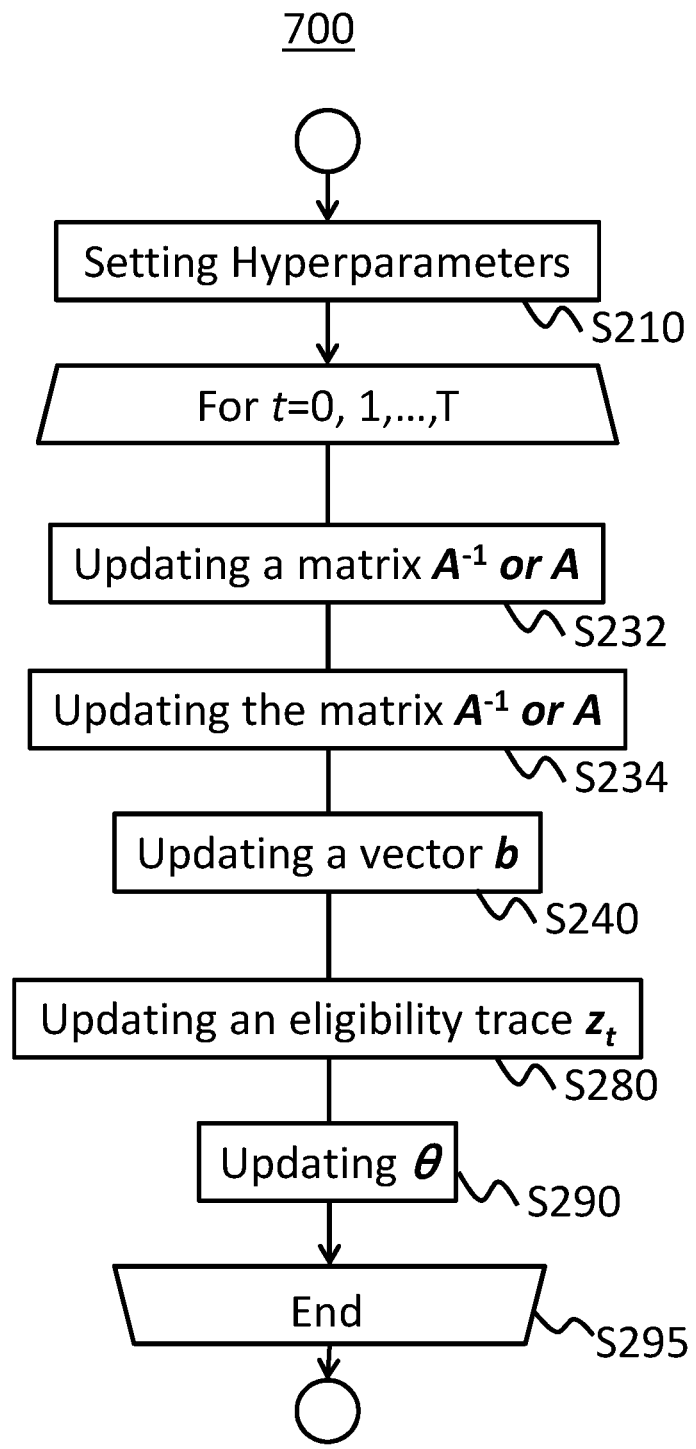
FIG. 7 shows an operational flow of training a prediction model, according to another embodiment of the present invention.

FIG. 7 shows an operational flow 700 of training a prediction model, according to another embodiment of the present invention. Operations of S210, S240, S280, and S290 in FIG. 7 are the same or the substantially same as the operations of S210, S240, S280, and S290 in FIG. 4, respectively. The training section 110 may perform operations of S232 and S234 in the sub-flow of FIG. 7 instead of S230 in FIG. 4.

At S232, the training section 110 may recursively update the matrix $A^{-1}$ (or A) by using the weighted difference between an eligibility trace $z_t$ of a current time step t and an eligibility trace $z_{t-1}$ of a previous time step t−1. The training section 110 may use the operation of S230 in FIG. 4 in at least part of the process of updating the matrix $A^{-1}$ (or A).

In an embodiment, the training section 110 may update the matrix $A^{-1}$ by subtracting, from the matrix $A^{-1}$, a fraction of which numerator is a product of (i) the matrix $A^{-1}$, (ii) the weighted difference between an eligibility trace $z_t$ at a current time step t and an eligibility trace $z_{t-1}$ at a previous time step t−1, (iii) the feature vector $\varphi_t$ of the time step t, (iv) the matrix $A^{-1}$, and (v) a mixture rate by which a rate of mixture of the two processes may be determined, and denominator is a sum of (I) a constant (e.g., 1) and (II) a product of (i) the feature vector $\varphi_t$ of the time step t, (ii) the matrix $A^{-1}$, (iii) the weighted difference between the eligibility trace $z_t$ and the eligibility trace $z_{t-1}$, and (iv) the rate of mixture. In the embodiment, the training section 110 may update the matrix $A^{-1}$ by:

$$A^{-1} \leftarrow A^{-1} - \frac{A^{-1}\lambda(z_t - \gamma z_{t-1})\varphi_t^T A^{-1}}{1 + \varphi_t^T A^{-1}\lambda(z_t - \gamma z_{t-1})} \quad \text{(Eqn.-4)}$$

In another embodiment, the training section 110 may update the matrix A by adding, to the matrix A, a product of (i) the weighted difference between an eligibility trace $z_t$ of a current time step t and an eligibility trace $z_{t-1}$ of a previous time step t−1, (ii) the feature vector $\varphi_t$ of the time step t, and (iii) a mixture rate by which a rate of mixture of the two processes may be determined. In the embodiment, the training section 110 may update the matrix A by:

$$A \leftarrow A + \lambda(z_t - \gamma z_{t-1})\varphi_t^T \quad \text{(Eqn.-5)}$$

In an embodiment, the weighted difference between the eligibility trace $z_t$ and the eligibility trace $z_{t-1}$ may be represented by $(z_t - \gamma z_{t-1})$ with the discount factor $\gamma$. In an embodiment, the mixture rate may be $\lambda$.

At S234, the training section 110 may further recursively update the matrix $A^{-1}$ (or $\lambda$) on the basis of the weighted difference between the feature vector $\varphi_t$ of the time step t and a feature vector $\varphi_{t+1}$ of the subsequent time step t+1.

In an embodiment, the training section 110 may update the matrix $A^{-1}$ by subtracting, from the matrix $A^{-1}$, a fraction of which numerator is a product of (i) the matrix $A^{-1}$, (ii) the eligibility trace $z_t$ of the time step t, (iii) the weighted difference between a feature vector $\varphi_t$ of a current time step t and a feature vector $\varphi_{t+1}$ of a subsequent time step t+1 (iv) the matrix $A^{-1}$, and (v) a mixture rate by which a rate of mixture of the two processes may be determined, and denominator is a sum of (I) a constant (e.g., 1) and (II) a product of (i) the weighted difference between a feature vector $\varphi_t$ of the current time step t and a feature vector $\varphi_{t+1}$ of the subsequent time step t+1, (ii) the matrix $A^{-1}$, (iii) the eligibility trace $z_t$ of the time step t, and (iv) the rate of mixture. In the embodiment, the training section 110 may update the matrix $A^{-1}$ by:

$$A^{-1} \leftarrow A^{-1} - \frac{A^{-1}z_t(1-\lambda)(\varphi_t - \gamma\varphi_{t-1})^T A^{-1}}{1 + (1-\lambda)(\varphi_t - \gamma\varphi_{t-1})^T A^{-1} z_t} \quad \text{(Eqn.-6)}$$

In another embodiment, the training section 110 may update the matrix A by adding, to the matrix A, a product of (iv) the weighted difference between a feature vector $\varphi_t$ of the time step t and the feature vector $\varphi_{t+1}$ of the time step t+1, (v) an eligibility trace $z_t$ of a current time step t, and (vi) a mixture rate by which a rate of mixture of the two processes may be determined. In the embodiment, the training section 110 may update the matrix A by:

$$A \leftarrow A + z_t(1-\lambda)(\varphi_t - \gamma\varphi_{t-1})^T \quad \text{(Eqn.-7)}$$

In an embodiment, the weighted difference between the feature vector $\varphi_t$ of the time step t and the feature vector $\varphi_{t+1}$ of the time step t+1 may be represented by $(\varphi_t - \gamma\varphi_{t+1})$ with the discount factor $\gamma$. In some embodiments, the mixture rate may be 1−(the mixture rate used at S232). In such embodiments, the mixture rate may be (1−$\lambda$).

FIG. 8 shows an exemplary process 800 according to the embodiment of FIG. 7. The process of FIG. 8 may represent the sub-flow of FIG. 7.

In the embodiments explained above, the apparatus may be used for prediction of values of a physical or non-physical system. In other embodiments, the apparatus may be used for reinforcement learning. In such embodiments, the processes of FIG. 5 and FIG. 8 may be used as an improved Boyan's LSTD prediction model in reinforcement learning. In such embodiments, the apparatus may be applied to a system having a plurality of state-action pairs.

FIG. 9 shows states, actions and rewards, 900 according to an embodiment of the present invention. In an embodiment of FIG. 9, starting from a state $s_1$ at a time step 1, the system is shifted into a state $s_2$ by taking an action $a_1$, which yields a reward $r_2$ at a time step 2, the system is shifted into a state $s_3$ by taking an action $a_2$, which yields a reward $r_3$ at a time step 3, . . . , and the system is shifted into a state $s_T$ by taking an action $a_{T-1}$, which yields a reward $r_T$ at a time step T.

The training section 110 may obtain sets of a state, an action, and a reward, each set including a state, a corresponding action, and a corresponding reward, such as (a state $s_1$, an action $a_1$, a reward $r_1$), (a state $s_2$, an action $a_2$, a reward $r_2$), . . . , (a state $s_T$, an action $a_T$, a reward $r_T$) at time steps 1, 2, 3, . . . , T, as training data 20 at S100. In the embodiments, the feature vector $\varphi_t$ at each time step t represents a state-action pair (a state $s_t$, an action $a_t$) of the target system observed at each time step t.

In these embodiments, the training section 110 may update a policy to choose an action in a given state at S200. For example, the training section 110 may update the policy after every operation of S290 at each time step t in the iteration of S230-S290 in FIG. 4 or FIG. 7.

In an embodiment, the training section 110 may update the policy by using the predicted cumulative reward $V_t$ at the current time step t. For example, the training section 110 may update the policy by using a predicted cumulative reward $V_t$ at each iteration at time step t of S230-S290 in FIG. 4 or FIG. 7.

In an embodiment for updating policy, the training section 110 may estimate predicted cumulative rewards $V_t$ for all possible actions that can be taken in a current state by calculating a product $\theta^T \varphi_t$ of a current $\theta$ and each feature vector $\varphi_t$ corresponding to the all possible actions. In an example where the current state is $s_t$ and possible actions at state $s_t$ is $a_1$, $a_2$ and $a_3$, the training section 110 may calculate $\theta^T \varphi_{(S_t, a1)}$ as $V_{(S_t, a1)}$, $\theta^T \varphi_{(S_t, a2)}$ as $V_{(S_t, a2)}$, and $\theta^T \varphi_{(S_t, a3)}$ as $V_{(S_t, a3)}$. $V_{(S, a)}$ may represent an expected cumulative reward that is expected by taking an action a at a state S.

The policy may be a deterministic policy. In an embodiment, the policy may be to choose an action that gives the largest predicted cumulative reward among actions that can be chosen in a current state. For example, the training section 110 may update the policy so as to choose the action $a_1$, among the actions $a_1$, $a_2$ and $a_3$, when $V_{(S_t, a1)}$ is the largest among $V_{(S_t, a1)}$, $V_{(S_t, a2)}$, and $V_{(S_t, a3)}$. In other embodiments, the policy may be ε-greedy and a softmax policy (Boltzmann exploration). The target system may transit from one state to another state by the action chosen by the policy.

In some embodiments, it may be desirable that values of a physical or non-physical system are stable. For example, a water level of a river may be desirably close to a specific level (e.g., x cm). In such embodiments, a reward $r_t$ may represents $(-1)\times$(a difference between the current value (e.g., current water level) and the desirable value (e.g., x cm)). Here, $-r_t$ may be regarded as a cost, rather than the reward. In these embodiments, the policy may be updated so as to maximize the reward (or minimize the cost). For example, policy may control water gates or discharge from a dam in order to stabilize the water level of the river.

In the embodiments related to FIG. 4 and FIG. 7, the iterations of S230 (or S232)-S290 may end when a time step t reaches to T or the end condition has met. In embodiments related to reinforcement learning, the end condition may be or may further comprise a condition that the policy does not change for a predetermined period of time.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
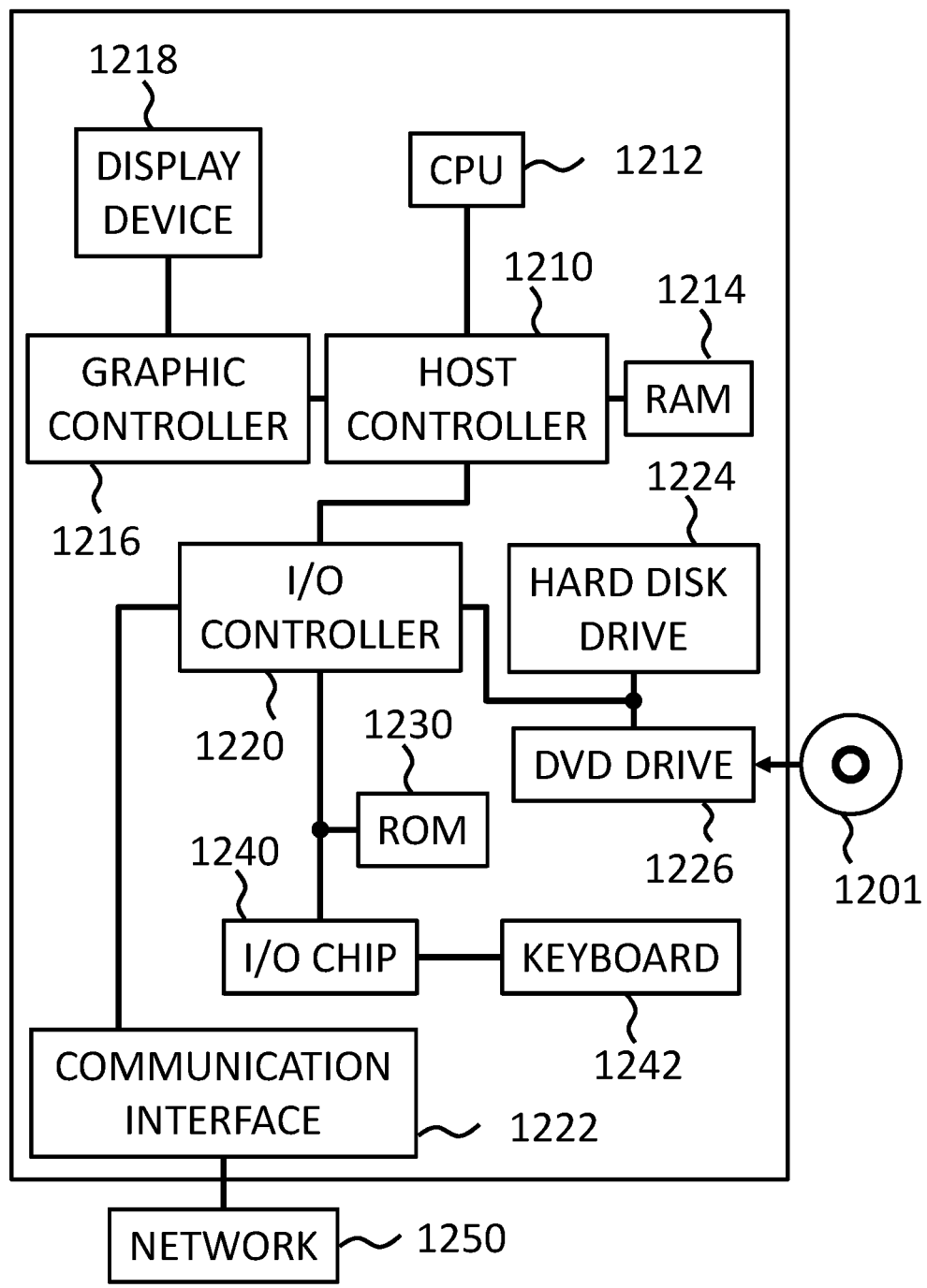
FIG. 10 shows an exemplary hardware configuration of a computer that functions as a cumulative rewards prediction model training system, according to an embodiment of the present invention.

FIG. 10 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence, machine learning, and prediction model training in particular. A model usually starts as a configuration of random values. Such untrained models must be trained before they can be reasonably expected to perform a function with success. Many of the processes described herein are for the purpose of training a model for cumulative reward prediction. Once trained, a model can be used for cumulative reward prediction, and may not require further training. In this way, a trained cumulative reward prediction model is a product of the process of training an untrained model.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" or "subsequent" in the claims, embodiments, or diagrams, it does not necessarily mean that the process must be performed in this order.

What is claimed is:

1. A computer-implemented method for prediction of a cumulative reward of a target system type, the method comprising:
    training, by employing training data related to a physical machine, a prediction model by performing an iteration for each time step, the iteration including:
        recursively updating a matrix by using a weighted difference between an eligibility trace of a current time step and an eligibility trace of a previous time step,
        recursively updating a vector by using a reward of a subsequent time step and the eligibility trace of the current time step; and
        recursively updating an eligibility trace of a subsequent time step by using a feature vector of the subsequent time step, each feature vector being an encoded representation of at least a state of a training system of the target system type at a corresponding time step, and
    outputting the matrix and the vector updated by using the reward of the subsequent time step and the eligibility trace of the current time step as the prediction model for estimating the cumulative reward of a target time step, the prediction model predicting non-stationary values in the target system type faster and with less computational resources regardless of hyperparameter values initially set.

2. The method of claim 1, wherein the reward of the subsequent time step represents a difference in value of a physical system between the current time step and the previous time step, and the prediction model predicts the cumulative reward as a cumulative difference in value of a future time step.

3. The method of claim 1, further comprising;
    estimating the cumulative reward,
    wherein the estimating the cumulative reward includes using a product of an inverse matrix of the matrix and the vector updated by using the reward of the subsequent time step and the eligibility trace of the current time step.

4. The method of claim 1, wherein the recursively updating a matrix further comprises:
    subtracting, from the matrix, a fraction of which numerator is a product of (i) the matrix, (ii) the weighted difference between an eligibility trace, at a current time step and an eligibility trace at a previous time step, (iii) the feature vector of the time step, and (iv) the matrix, and denominator is a sum of (I) a constant and (II) a product of (i) the feature vector of the time step, (ii) the matrix, and the weighted difference between the eligibility trace at the current time step and the eligibility trace at the previous time step.

5. The method of claim 1, wherein the recursively updating the vector includes:
    adding a product of the reward of the subsequent time step and the eligibility trace of the current time step to the vector updated by using the reward of the subsequent time step and the eligibility trace of the current time step.

6. The method of claim 1, wherein the recursively updating the eligibility trace at the subsequent time step includes:
adding the feature vector of the subsequent time step to a product of a lambda value, added to a discount factor of the weighted difference, and added to the eligibility trace of the current time step.

7. The method of claim 1, wherein the physical machine is a machine of which temperature fluctuates.

8. The method of claim 1, wherein at least part of the training of the prediction model is performed using Boyan's Least Square Temporal Difference (LSTD).

9. The method of claim 1, wherein the iteration further includes:
recursively updating the matrix on a basis of the weighted difference between the feature vector of the time step and a feature vector of the subsequent time step.

10. The method of claim 8, wherein the iteration further includes:
updating a policy to choose an action in a given state by using a predicted cumulative reward at the current time step.

11. An apparatus comprising:
a processor or a programmable circuitry; and
one or more computer readable mediums collectively including instructions that, when executed by the processor or the programmable circuitry, cause the processor or the programmable circuitry to perform operations including:
training, by employing training data related to a physical machine, a prediction model by performing an iteration for each time step, the iteration including:
recursively updating a matrix by using a weighted difference between an eligibility trace of a current time step and an eligibility trace of a previous time step,
recursively updating a vector by using a reward of a subsequent time step and the eligibility trace of the current time step; and
recursively updating an eligibility trace of a subsequent time step by using a feature vector of the subsequent time step, each feature vector being an encoded representation of at least a state of a training system of the a target system type at a corresponding time step, and
outputting the matrix and the vector updated by using the reward of the subsequent time step and the eligibility trace of the current time step as the prediction model for estimating the cumulative reward of a target time step, the prediction model predicting non-stationary values in the target system type faster and with less computational resources regardless of hyperparameter values initially set.

12. The apparatus of claim 11, wherein the reward of the subsequent time step represents a difference in value of a physical system between the current time step and the previous time step, and the prediction model predicts the cumulative reward as a cumulative difference in value of a future time step.

13. The apparatus of claim 11, wherein the operations further comprise;
estimating the cumulative reward,
wherein the estimating the cumulative reward includes using a product of an inverse matrix of the matrix and the vector updated by using the reward of the subsequent time step and the eligibility trace of the current time step.

14. The apparatus of claim 11, wherein the recursively updating a matrix further comprises:
subtracting, from the matrix, a fraction of which numerator is a product of (i) the matrix, (ii) the weighted difference between an eligibility trace, at a current time step and an eligibility trace at a previous time step, (iii) the feature vector of the time step, and (iv) the matrix, and denominator is a sum of (I) a constant and (II) a product of (i) the feature vector of the time step, (ii) the matrix, and the weighted difference between the eligibility trace at the current time step and the eligibility trace at the previous time step.

15. The apparatus of claim 11, wherein the recursively updating the vector includes:
adding a product of the reward of the subsequent time step and the eligibility trace of the current time step to the vector updated by using the reward of the subsequent time step and the eligibility trace of the current time step.

16. A computer program product including one or more non-transitory computer readable storage mediums collectively storing program instructions that are executable by a processor or programmable circuitry to cause the processor or programmable circuitry to perform operations comprising:
training, by employing training data related to a physical machine, a prediction model by performing an iteration for each time step, the iteration including at least:
recursively updating a matrix by using the weighted difference between an eligibility trace of a current time step and an eligibility trace of a previous time step,
recursively updating a vector by using a reward of a subsequent time step and the eligibility trace of the current time step; and
recursively updating an eligibility trace of a subsequent time step by using a feature vector of the subsequent time step, each feature vector being an encoded representation of at least a state of a training system of the a target system type at a corresponding time step, and
outputting the matrix and the vector updated by using the reward of the subsequent time step and the eligibility trace of the current time step as the prediction model for estimating the cumulative reward of a target time step, the prediction model predicting non-stationary values in the target system type faster and with less computational resources regardless of hyperparameter values initially set.

17. The computer program product of claim 16, wherein the reward of the subsequent time step represents a difference in value of a physical system between the current time step and the previous time step, and the prediction model predicts the cumulative reward as a cumulative difference in value of a future time step.

18. The computer program product of claim 16, wherein the operations further comprise;
estimating the cumulative reward,
wherein the estimating the cumulative reward includes using a product of an inverse matrix of the matrix and the vector updated by using the reward of the subsequent time step and the eligibility trace of the current time step.

19. The computer program product of claim 16, wherein the recursively updating a matrix further comprises:
subtracting, from the matrix, a fraction of which numerator is a product of (I) a product of (i) the matrix, (ii) the weighted difference between an eligibility trace, at a current time step and an eligibility trace at a previous time step, (iii) the feature vector of the time step, and (iv) the matrix, and denominator is a sum of (I) a constant and (II) a product of (i) the feature vector of the time step, (ii) the matrix, and the weighted difference between the eligibility trace at the current time step and the eligibility trace at the previous time step.

20. The computer program product of claim 16, wherein the recursively updating the vector includes:

adding a product of the reward of the subsequent time step and the eligibility trace of the current time step to the vector updated by using the reward of the subsequent time step and the eligibility trace of the current time step.

* * * * *